(12) United States Patent
Stinnett

(10) Patent No.: US 6,364,285 B1
(45) Date of Patent: Apr. 2, 2002

(54) UTILITY VALVE KEY

(76) Inventor: Dan L. Stinnett, HCR 56 Box 61, John Day, OR (US) 97845

( * ) Notice: Subject to any disclaimer, the term of this patent is extended or adjusted under 35 U.S.C. 154(b) by 0 days.

(21) Appl. No.: 09/564,453

(22) Filed: May 3, 2000

(51) Int. Cl.⁷ .............................................. F16K 35/06
(52) U.S. Cl. ..................................................... 251/293
(58) Field of Search ................................. 251/293, 292

(56) References Cited

U.S. PATENT DOCUMENTS

| | | | | |
|---|---|---|---|---|
| 275,042 A | * | 4/1883 | Heysinger | 251/293 |
| 400,944 A | * | 4/1889 | Powell | 251/293 |
| 935,856 A | * | 10/1909 | O'Meara | 251/293 |
| 1,181,565 A | * | 5/1916 | Block | 251/293 |
| 2,198,455 A | * | 4/1940 | Mueller et al. | 251/293 |
| 3,658,086 A | * | 4/1972 | Hart | 137/368 |
| 4,266,320 A | * | 5/1981 | Grant | 16/114 R |
| 4,480,814 A | | 11/1984 | Vinciguferra | 251/292 |
| 4,871,144 A | | 10/1989 | Kaniaris | 251/291 |
| 5,456,278 A | | 10/1995 | Morris | 137/1 |
| D370,606 S | | 6/1996 | Cole et al. | D8/21 |
| 5,638,590 A | | 6/1997 | Silano | 29/254 |
| 5,988,209 A | | 11/1999 | Hardy | 137/382 |

\* cited by examiner

*Primary Examiner*—John Fox
(74) *Attorney, Agent, or Firm*—Liebler, Ivey&Connor; Floyd E. Ivey

(57) ABSTRACT

A utility valve key comprising at least one center member which may have at least one handle on one end. The opposite end may include at least one key member directly attached thereto for turning a valve including, but not limited to, plastic ball valves, gate valves and brass ball valves.

1 Claim, 3 Drawing Sheets

UTILITY VALVE KEY

FIELD OF THE INVENTION

The present invention relates generally to a utility valve key, and in particular, to a utility valve key suitable for the use with all types of valves including but not limited to plastic ball valves, gate valves and brass ball valves. This key that may be applied to water, stop, meter and gas valves.

BACKGROUND OF THE INVENTION

A variety of apparatus' are known in the prior art which are directed toward valve keys. The prior art has disclosed various valve keys which are direct to use with particular valves. However, the prior art has not disclosed a utility key that is multi-functional for use with all different types of valves. Nor has the prior art disclosed a key that is adjustable or extendable to various lengths for use in different situations.

In the utility industry it is common to have a large number of valves which can be operated by keys. A worker daily may encounter may different types of valves that require a different valve key. Most utility valves, such as water or gas valves, are located underground, and are operated by inserting an extended tool through a vertical access pipe. Sometimes, these main shutoff valves are not often touched and have a tendency to stick or actually corrode, requiring extra physical effort to turn them off.

Since the worker may encounter a number of different valves during a normal work day, there is a need for a multiple functioning tool. A different multiple use key capable of shutting off both gas and water main valves is an important asset.

In addition, there is a need for a multiple functioning valve key with a long vertical reach for the water main valve. Although in some situations, such as limited access an extended key would not fit, and a key of a shorter length is needed.

Further, a key should have adequate leverage for persons of limited manual strength to be able to turn both the gas and water valves. The key itself should be rigid enough to move sticky or corroded valves without suffering any distortion or structural failure. In addition a key that is separable, will be able to be easily stored.

U.S. Pat. No. 5,456,278 to Morris, which shows a U-shaped utility shutoff key. U.S. Pat. No. 5,638,590 to Silano shows a key that is over several feet long for use in valves set below street level. U.S. Pat. No. 4,871,144 to Kamiaris shows a regulator key for use with gas tanks. U.S. Pat. No. 5,988,209 to Hardy shows a shutoff valve. U.S. Pat. No. 4,480,814 to Vinciguferra shows a combination of a ball valve and a key. U.S. Pat. No. 370,606 to Cole is a design patent for a valve key.

The patents referred to herein are provided herewith in an Information Disclosure Statement in accordance with 37 CFR 1.97.

SUMMARY OF THE INVENTION

The utility valve key of this invention may comprise at least one center member which may have at least one handle on one end. The opposite end may include at least one key member directly attached thereto for turning a valve.

Because the apparatus may be extended to different lengths depending on the requirements of the particular job, a single apparatus, instead of multiple tools, may be able to perform a plurality of functions. Further, because the various key members for the different valves may be removable and used for a particular job, additional apparatuses are unnecessary.

Moreover, this apparatus may save time and expense by having all the necessary elements of a variety of tools composed into one apparatus. This apparatus may have multiple lengths and utilizes multiple key members for different situations.

Brief Description of the Drawings

The foregoing and other features and advantages of the present invention will become more readily appreciated as the same become better understood by reference to the following detailed description of the preferred embodiment of the invention when taken in conjunction with the accompanying drawings, wherein.

Detailed Description of the Preferred Embodiment(s)

Figure 1:
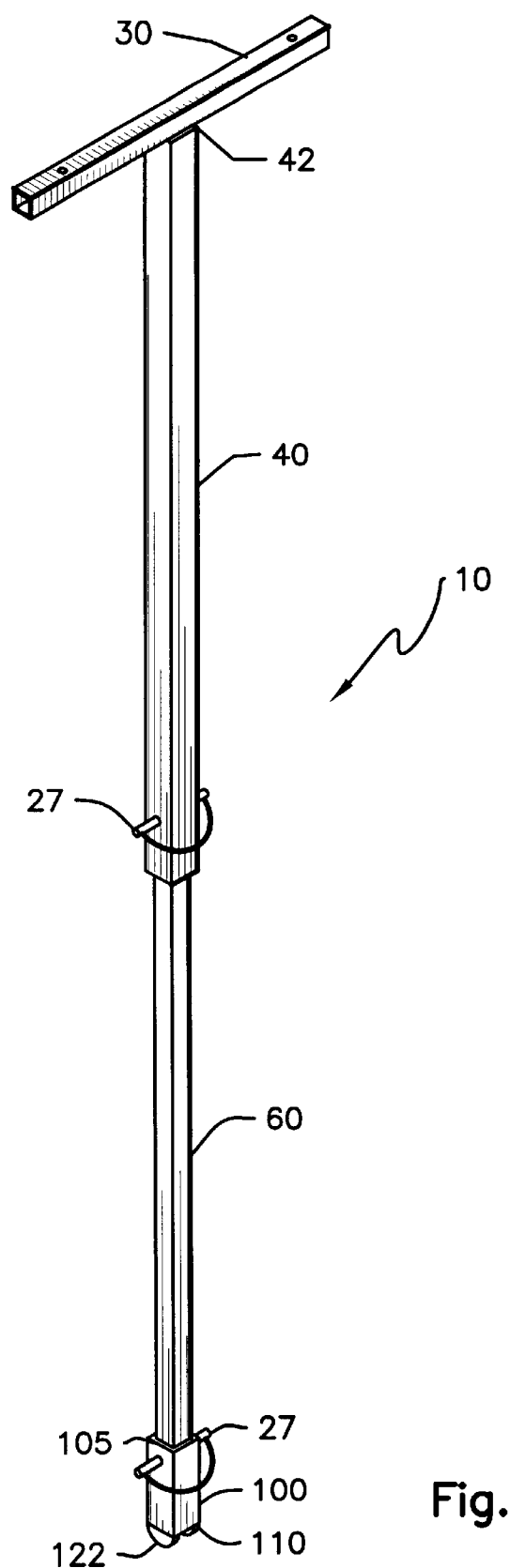
FIG. 1 is a perspective view of the apparatus, constructed showing the handle, key member, and members.

The preferred embodiment of the utility valve key herein disclosed is depicted in FIGS. 1–6.

The utility valve key 10 may comprise at least one center member 40 having an upper end 42 and a lower end 44; and at least one key member 25 removably affixed by means 27 to said lower end 44. The at least one key member 25 may comprise a base portion 100 having a first end 105 and a second end 110. The affixing means 27 may include, but is not limited to, at least one pin, bolt and nut, screw, or the like joining said base portion 100 to said at least one center member 40. The at least one center member 40 and the at least one key member 25 may be composed of, but not limited to, a rigid material such as metal or plastic. The at least one key member 25 should be strong enough to apply pressure to move a valve. In the preferred embodiment, the at least one center member 40 is a metal tube and is approximately 3 feet in length.

The utility valve key 10 may be extendable. The at least one center member 40 may be composed of a first center member 45 and a second center member 50. The second center member 50 may be composed of a similar material as the first center member 45.

Each of the first and second center members 45, 50 may have a bore extending therethrough, said bore extending from said lower end 44 to said upper end 42. The second center member 50 may be slidably positioned within the first center member 45 bore. Depending on the desired length of the apparatus, the second center member upper end 52 may be positioned inside the first center member 45 bore proximal to the upper end 42.

The second center member 50 may be secured by means 27 to said first center member 45. The securing means 27 may include, but is not limited to, at least one pin, bolt and nut, screw, or the like.

Figure 2:
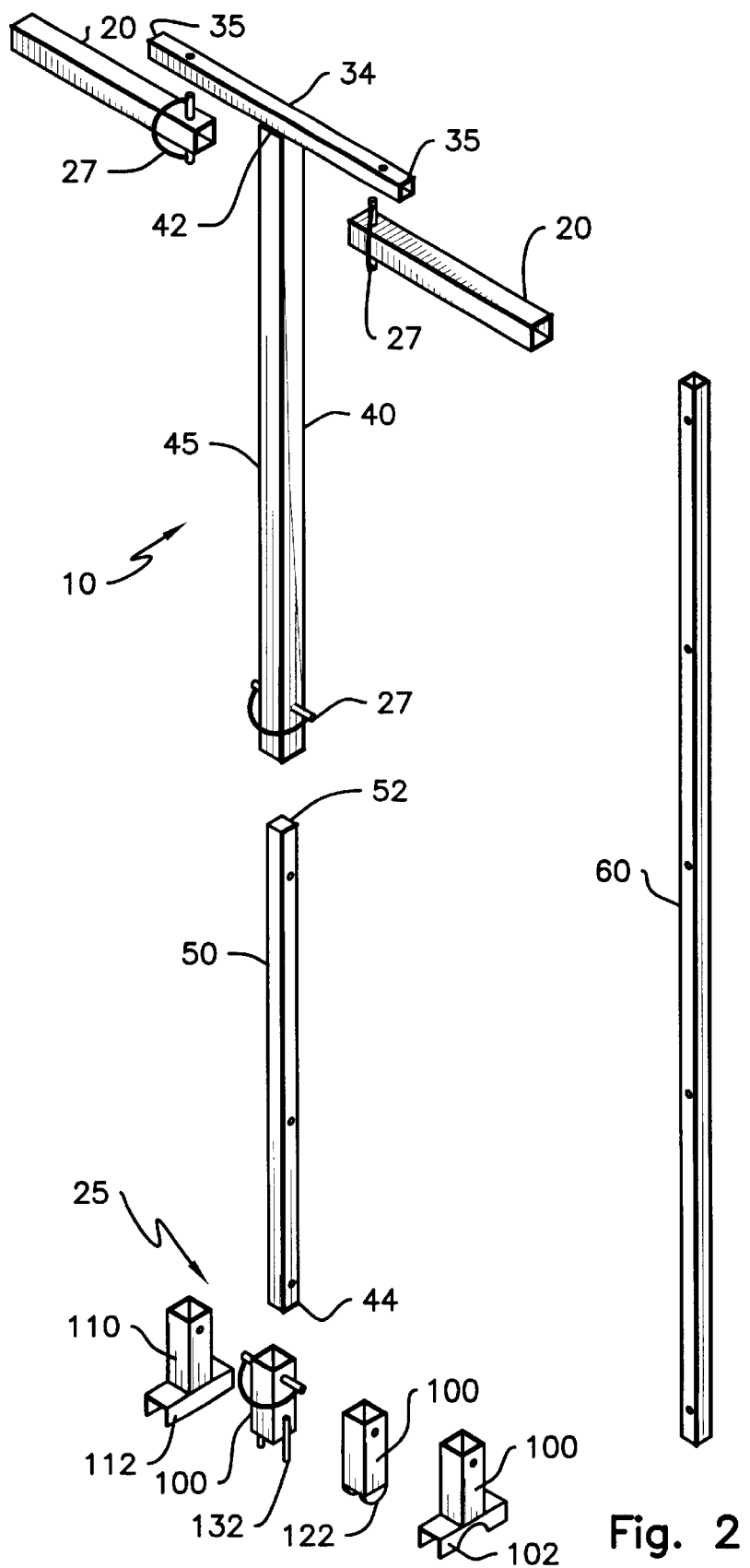
FIG. 2 is a of the apparatus in disconnected, showing the handle, handle extensions, members, and all the key members.

This second center member 50 may be of various lengths. As shown in FIG. 2, the second center member 50 may be a relatively short length or alternatively the second center member may be a longer length, as denoted by 60.

As shown in FIGS. 1 and 2, the utility valve key 10 may include at least one holding member 30 for holding said at least one center member 40 proximal said upper end 42. The at least one holding member 30 may be formed as an integral piece with the at least one center member 40. In the preferred embodiment, the at least one holding member 30 is at least one handle with ends 35. It will be recognized by a person of ordinary skill in the art, that the at least one holding member 30 may be of various lengths and configurations. In an alternative embodiment, extension members 20 may be secured by means 27 to said at least one holding member 30 at each of the ends 35 to thereby adjust the length of the at least one holding member 30. The securing means 27 may include, but is not limited to, at least one pin, bolt and nut, screw, or the like.

The utility valve key 10 may further include at least one key member 25 removably affixed by means 27 to said lower end 44. The at least one key member 25 may comprise a base portion 100 having a first end 105 and a second end 110. The base portion 100 may have a bore extending from the base portion first end 105 to a point distal therefrom. As shown in FIG. 1, the base portion bore may receive said lower end 44 or in an alternative embodiment (not shown), said base portion 100 may be received into the center member bore at lower end 44. The affixing means 27 may include, but is not limited to, at least one pin, bolt and nut, screw, or the like, joining said base portion 100 to said at least one center member 40.

Figure 3:
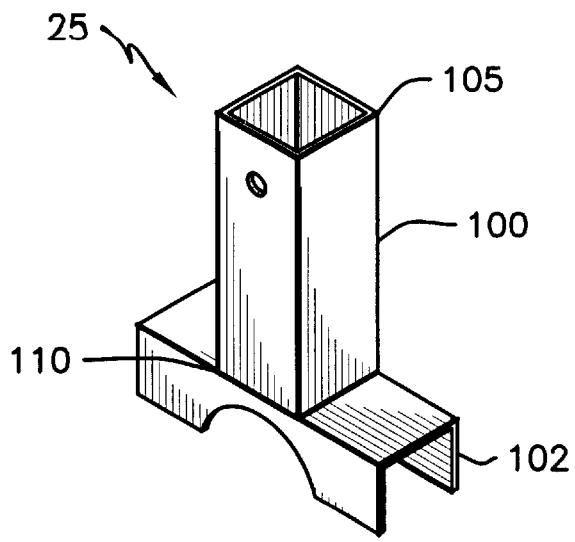
FIG. 3 is a side view of the key member, for use with plastic ball valves.

The kind of key member(s) 25 to be used depends on the valve to be turned and its configuration. In one embodiment, as shown in FIG. 3, the at least one key member 25 may include at least one U-channel portion 102 affixed to and downwardly extending from said second end 110. This particular type of key member is for use primarily with plastic ball valves.

Figure 4:
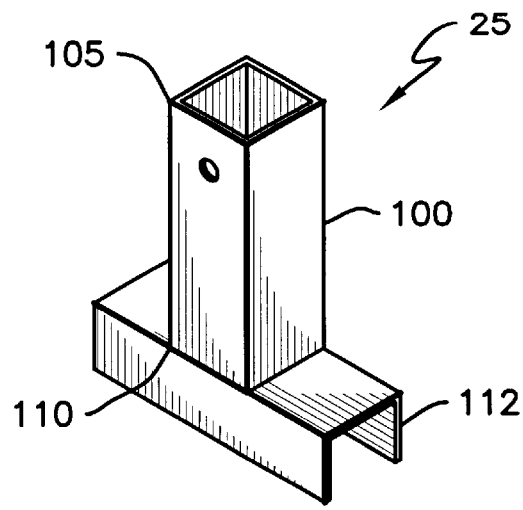
FIG. 4 is a side view of the key member, for use with brass ball valves.

In another embodiment, as shown in FIG. 4, the at least one key member may include at least one projection comprising at least two rectangular shaped portions 112 in parallel relation and downwardly extending from said second end 110. This particular type of key member may be used with brass ball valves. The rectangular shaped portions 112 may be of various sizes and lengths depending on the size of the brass ball valves.

Figure 5:
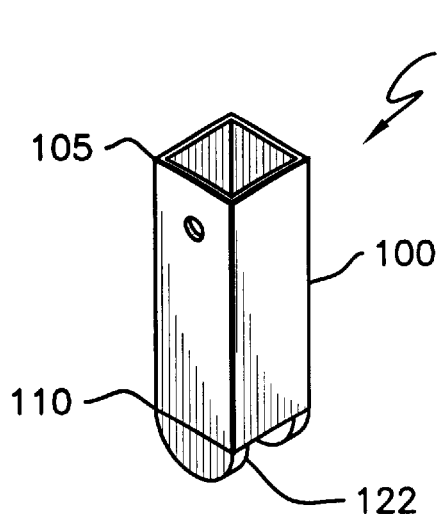
FIG. 5 is a side view of the key member, for use with stop and waste and meter valves.

In another embodiment, as shown in FIG. 5, the at least one key member may comprise at least one projection comprising at least two half-circle portions 122 in parallel relation and downwardly extending from said second end 110. This particular type of key member may be used with stop and waste and meter valves.

Figure 6:
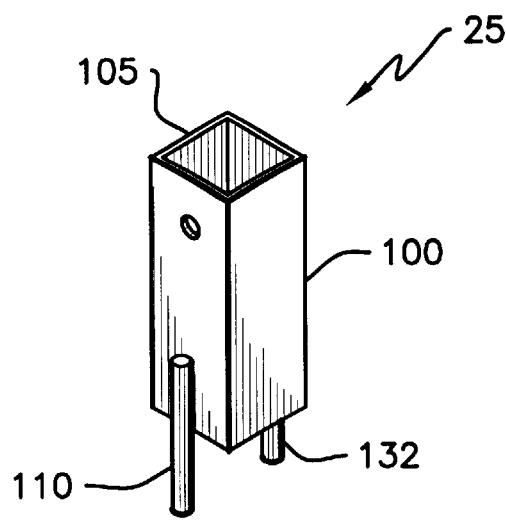
FIG. 6 is a side view of the key member, for use with gate valves.

In another embodiment, as shown in FIG. 6, the at least one key member may include at least one extension member 132 extending downwardly from said second end 110. In the preferred embodiment, the key member 25 may comprise two extensions 132 spaced apart to thereby fit into a gate valve. The at least one extension 132 may be of various lengths and sizes depending upon the configuration of the gate valve to be turned. The at least one extension 132 is preferably of a diameter that is sufficient to give the at least one extension 132 sufficient strength for use with a gate valve.

Further disclosed is a method of using the utility valve key 10 to turn a valve comprising the steps of joining said at least one key member base portion 100 to said at least one center member lower end 44; placing said at least one key member onto a valve; turning said at least one key member 25 thereby turning said valve.

Further disclosed is a method of assembling the utility valve key 10 and turning a valve comprising the steps of sliding the second center member 50 into the bore of said first center member 40; securing said second center member 50 to said first center member 40; joining said at least one key member base portion 100 to said center member lower end 44; placing said at least one key member 25 onto a valve; and turning said at least one key member 25 thereby turning said valve.

While a preferred embodiment of the present invention has been shown and described, it will be apparent to those skilled in the art that many changes and modifications may be made without departing from the invention in its broader aspects.

The appended claims are therefore intended to cover all such changes and modifications as fall within the true spirit and scope of the invention.

I claim:

1. An apparatus comprising:
   a. at least one center member having an upper and a lower end; the center member composed of a tube;
   b. at least one key member removably and slidably affixed by connection means to said lower end, the key member composed of a tube having a cross-section which matches the cross-section of the center member; the cross section being angular to resist rotation between the center member and the key member; said at least one key member comprising a base portion having a first end and a second end; connection means such as to prevent rotation of the center member relative to the key member;
   c. said at least one projection comprises at least two half-circle portions in parallel relation and downwardly extending from said second end;
   d. said at least one key member includes at least one projection extending downwardly from said second end; the at least one projection extending downwardly from said second end composed of at least two rectangular shaped portions.

* * * * *